United States Patent
Davies

(10) Patent No.: US 7,877,948 B2
(45) Date of Patent: Feb. 1, 2011

(54) FASTENER SYSTEM FOR FIXING HARDENED PLATES

(75) Inventor: Brian Davies, Esperance (AU)

(73) Assignee: Brian Investments PTY Ltd., Esperance (AU)

( * ) Notice: Subject to any disclaimer, the term of this patent is extended or adjusted under 35 U.S.C. 154(b) by 620 days.

(21) Appl. No.: 11/792,589

(22) PCT Filed: Dec. 9, 2005

(86) PCT No.: PCT/AU2005/001870

§ 371 (c)(1),
(2), (4) Date: Jun. 8, 2007

(87) PCT Pub. No.: WO2006/060877

PCT Pub. Date: Jun. 15, 2006

(65) Prior Publication Data

US 2007/0258791 A1 Nov. 8, 2007

(30) Foreign Application Priority Data

| Dec. 9, 2004 | (AU) | ............... | 2004907031 |
| Dec. 15, 2004 | (AU) | ............... | 2004907136 |
| Jan. 18, 2005 | (AU) | ............... | 2005900181 |
| Feb. 15, 2005 | (AU) | ............... | 2005900691 |
| Mar. 22, 2005 | (AU) | ............... | 2005901399 |

(51) Int. Cl.
*E04B 2/00* (2006.01)

(52) U.S. Cl. ............... 52/506.05; 411/354; 411/366.1; 411/397; 411/427

(58) Field of Classification Search ............ 52/506.05; 411/354, 366.1, 397, 427
See application file for complete search history.

(56) References Cited

U.S. PATENT DOCUMENTS

| 1,840,722 | A | * | 1/1932 | Jandus | ............... | 293/144 |
| 2,275,992 | A | | 3/1942 | Rahner | | |
| 3,152,375 | A | * | 10/1964 | Blakeley | ............... | 411/347 |
| 3,153,512 | A | | 10/1964 | Polzin | | |
| 3,233,932 | A | * | 2/1966 | Utterback | ............... | 292/175 |
| 3,368,022 | A | * | 2/1968 | Mescher et al. | ........... | 373/112 |
| 3,440,922 | A | | 4/1969 | Cohen | | |
| 3,468,211 | A | | 9/1969 | Suan | | |
| 3,611,862 | A | | 10/1971 | Walker | | |

(Continued)

FOREIGN PATENT DOCUMENTS

AU 2005100072 3/2005

(Continued)

OTHER PUBLICATIONS

"Wear-Resistant Steel Plate Processing Recommendations". http://www.thyssenkrupp-steel.com/upload/binarydata_tkscsgb/4623/xar_verarbeitung_zerspanen.pdf. Jul. 1, 2004.

*Primary Examiner*—Richard E Chilcot, Jr.
*Assistant Examiner*—Mark R Wendell
(74) *Attorney, Agent, or Firm*—Blank Rome LLP

(57) ABSTRACT

A fastener system for fixing hardened plates includes a fastener element having a frusto-conical head and a threaded shaft portion, wherein a smallest outer diameter of the frusto-conical head is adjacent the threaded shaft, and a largest outer width of the shaft is smaller than a smallest diameter of the head.

10 Claims, 13 Drawing Sheets

U.S. PATENT DOCUMENTS

| | | |
|---|---|---|
| 4,021,991 A | 5/1977 | Hotz |
| 4,047,415 A * | 9/1977 | Crane et al. .................... 72/125 |
| 4,137,681 A | 2/1979 | Pasley |
| 5,411,154 A * | 5/1995 | Vargo .......................... 211/189 |
| 5,967,053 A | 10/1999 | Toussaint et al. |
| 6,854,808 B2 * | 2/2005 | Kostecki ........................ 298/7 |
| 2003/0173339 A1 * | 9/2003 | Fryer et al. ............... 219/121.5 |

FOREIGN PATENT DOCUMENTS

| | | |
|---|---|---|
| GB | 1445255 A | 8/1976 |
| JP | 08-291814 A | 11/1996 |

* cited by examiner

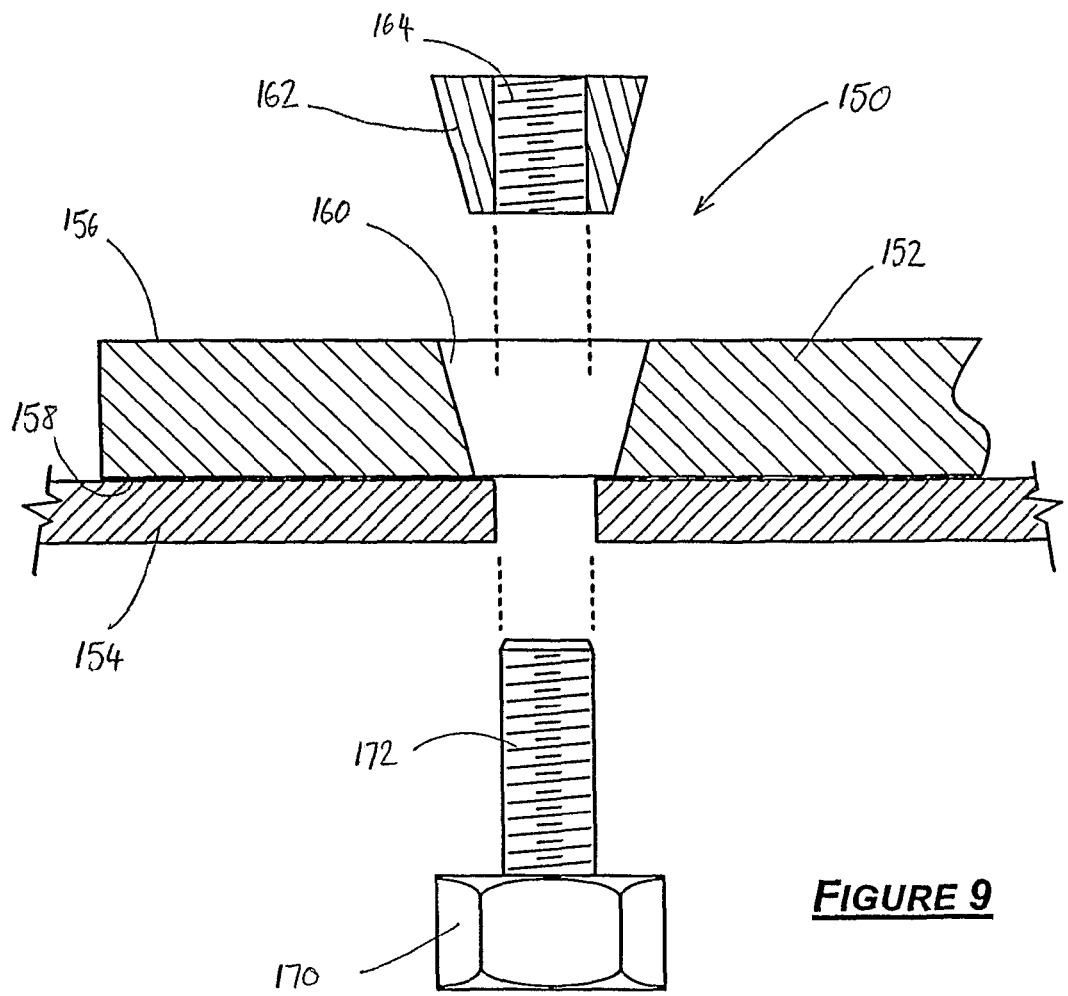
FIGURE 9
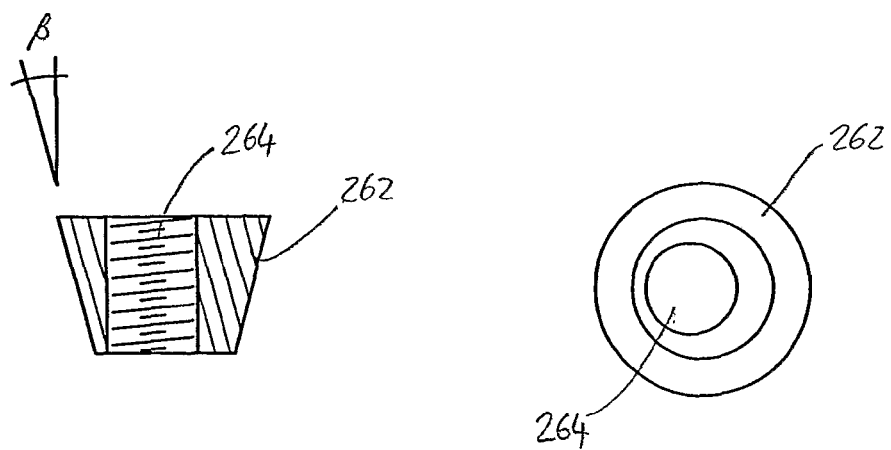
FIGURE 10  FIGURE 11

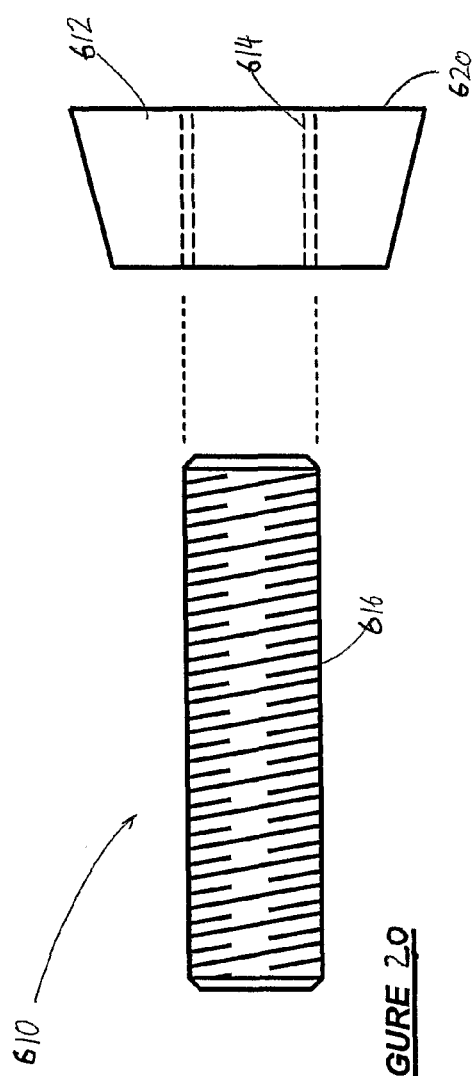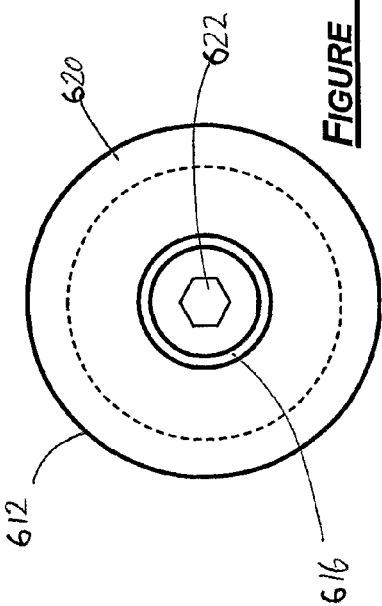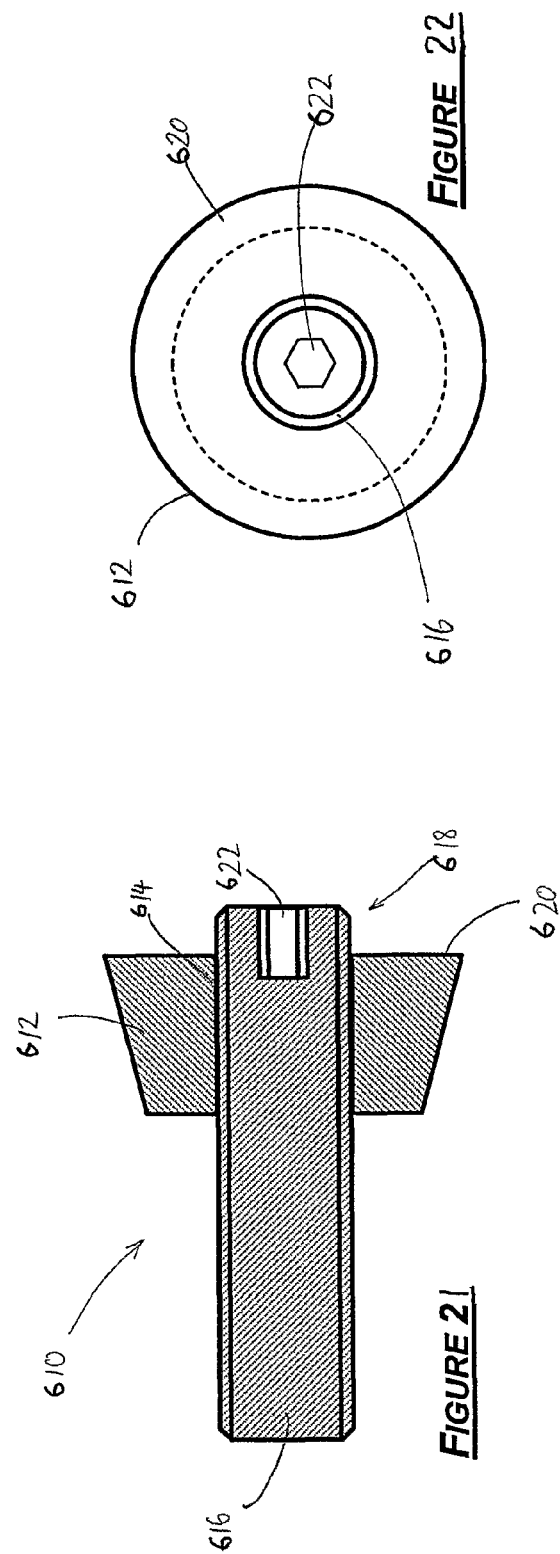

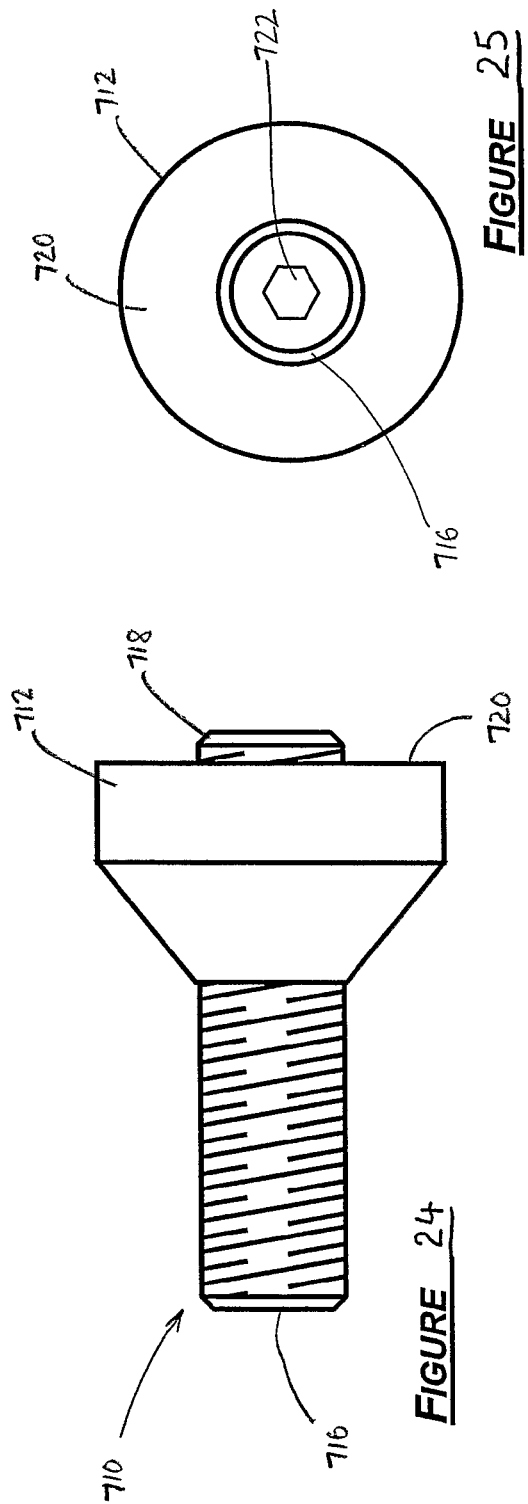
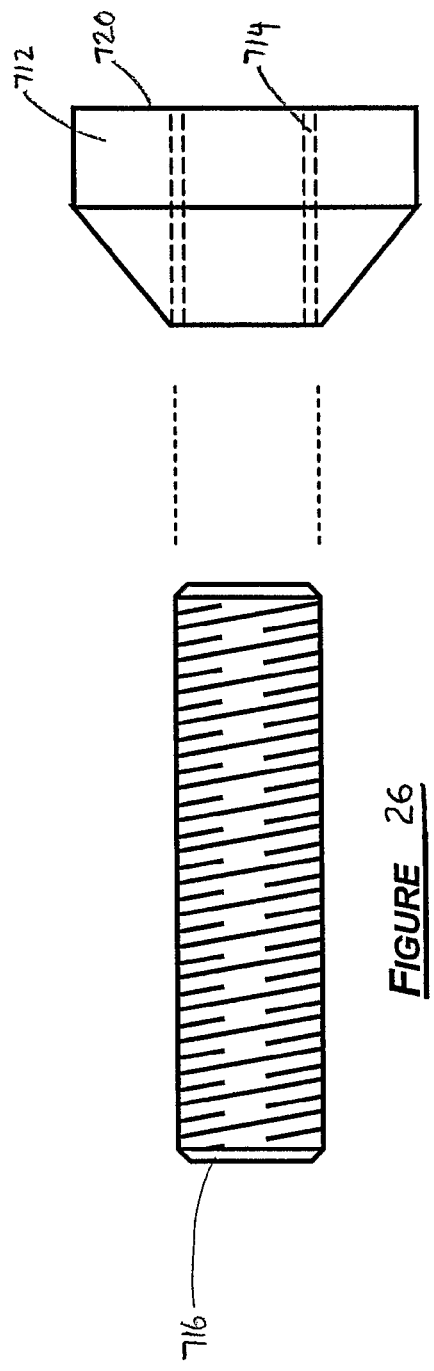

FASTENER SYSTEM FOR FIXING HARDENED PLATES

CROSS-REFERENCE TO RELATED APPLICATIONS

This application is a National Phase Application of PCT/AU2005/001870, filed Dec. 9, 2005, which claims priority to Australian Patent Application Nos. 2004907031, filed Dec. 9, 2004; 2004907136, filed Dec. 15, 2004; 2005900181, filed Jan. 18, 2005; 2005900691, filed Feb. 15, 2005; and 2005901399, filed Mar. 22, 2005, all of which are incorporated by reference herein.

FIELD OF THE INVENTION

The present invention relates to a fastener system for fixing a hardened plate and for minimising wear on structural elements.

BACKGROUND OF THE INVENTION

Plates of hardened material, such as steel and steel alloys, are often used to minimise the effect of wear on structural elements of a piece of equipment. Often, these hardened plates are called wear plates because the material of the plate is selected for its resistance to wear. Wear plates are also known to be made of other materials, such as rubber and ceramics. Examples of equipment which use wear plates include hoppers, bins and chutes used in rock handling equipment and in an ore processing plant. This sort of equipment can be exposed to wear in the form of sliding and/or gouging abrasion. The wear plates act as a sacrificial element so that the plates are worn rather than the structural element of the equipment. The plates can be readily exchanged once worn, thus extending the life of the working equipment.

The wear plates are typically square in shape such that they can be tiled across the surface of the structural element to be protected from wear. Each wear plate is provided with four bolt holes, one near each corner.

Recently, harder materials have been used to form a wear plate. Such a harder wear plate is a sheet of very hard material (such as a steel alloy having a Brinell hardness of approximately 500 HB) which is attached to the surface of the equipment which would otherwise be subject to wear. It is possible to perform cutting, welding, drilling and machining operations on such steels, however the difficulty of such operations increases with the hardness of the material. For example, when drilling steel of this hardness a tungsten carbide drill bit is usually required, and the feed and speed rates of the drill bit need to be carefully selected, thus requiring complex expensive drilling machinery.

FIG. 1 shows a cross sectional view of a wear plate 10 with a hole 12 for fixing the wear plate 10 to a structural element (not shown) according to a known system. The surface 14 on the wear plate 10 is exposed to wear. Therefore, the opposing surface 16 will abut the structural element. In this system, a standard counter sunk bolt 18—as shown in FIGS. 2 and 3—is provided. The counter sunk bolt 18 has an externally threaded shaft 20 which extends from a frusto-conical head 22. The head 22 is provided with a hexagonal hole 24 for receiving an Allen key to hold or turn the bolt 18 during fastening etc.

Obviously, the structural element would be provided with a hole for receiving the shaft 20 of the bolt 18. The hole 12 in the structural element could be either an internally threaded hole to threadingly engage the thread on the shaft 20, or could merely be a throughway such that a nut (not shown) can be threaded onto the shaft 20.

The hole 12 in the wear plate 10 is shaped to allow the bolt 18 to be recessed with respect to the wear surface 14. Accordingly, the hole 12 comprises a first cylindrical portion 26, a frusto-conical portion 28 and a second cylindrical portion 30. The first and second cylindrical portions 26, 30 are dimensioned to receive the head 22 and the shaft 20 of the bolt 18, respectively. It should be noted that the frusto-conical portion 28 is dimensioned to compliment the frusto-conical shape of the head 22. Furthermore, as shown in FIG. 2, the half-opening angle θ of the frusto-conical head 22 is 45°.

The bolt 18 is recessed to minimise the amount of wear which the bolt head 22 will experience. This is at a price to the wear plate 10 because the recessing of the head 22 leaves a void in the cylindrical portion 30. This in turn allows material to catch on the wall of the cylindrical portion 30 which increases wear around the hole 12. It is noted that prior to this invention the bolt 18 was a standard "off-the-shelf" bolt, typically having a hardness which is much less than the hardness of more recent harder ware plates.

Due to the properties of the material used in the wear plates 10, forming the hole 12 is an expensive and time consuming process. Generally, the hole 12 can be created in at least two drilling operations using a small drill bit to create the second cylindrical portion 30, and a larger drill bit with a conical tip to create both the first cylindrical portion 26 and the frusto-conical portion 28.

The procedure for lining a piece of equipment with wear plates is, for each wear plate in turn, as follows:

1. the wear plate is located on the surface of the equipment;
2. the four bolts are inserted through their respective holes in the wear plate and through corresponding holes in the equipment; and
3. threading nuts onto each of the bolts.

Given that there can be in excess of 100 wear plates lining, for example, the walls of an ore chute, this is clearly a very time consuming task. Plant equipment downtime ultimately costs the plant due to lost productivity. For this reason it is highly desirable that the time taken to line a piece of equipment with wear plates be reduced.

SUMMARY OF THE INVENTION

According to one aspect of the present invention, there is provided a fastener element comprising a frusto-conical head and a threaded shaft, wherein the smallest outer diameter of the frusto-conical head is adjacent the threaded shaft, and the largest outer width of the shaft is smaller than the smallest outer diameter of the head.

Typically the half opening angle of the frusto-conical head is within the range of 5° to 20°, preferably the half opening angle of the frusto-conical head is about 15°.

In one embodiment the frusto-conical head is hardened, preferably to a Brinell hardness of at least 300 HB.

In one embodiment the fastener element further comprises a shoulder between the head and the shaft, the shoulder having a diameter larger than the outer width of the shaft and smaller than the smallest outer diameter of the head.

According to a variation of this aspect of the present invention there is provided a fastener element comprising a frusto-conical body and an internally threaded hole extending through the body and substantially parallel to the centre line of the cone shape, wherein the smallest outer diameter of the body is adjacent an opening to the threaded hole, and the diameter of the threaded hole is smaller than the smallest outer diameter of the body.

Typically the half opening angle of the frusto-conical body is within the range of 5° to 20°, preferably about 15°.

In one embodiment the body is hardened a Brinell hardness of at least 300 HB.

In one embodiment the fastener element further comprises a shoulder between the body and the internally threaded hole, the shoulder having a diameter larger than the diameter of the hole and smaller than the smallest outer diameter of the body.

According to another aspect of the present invention there is provided a fastener element comprising a frusto-conical head and a threaded shaft, wherein at least the frusto-conical head is hardened to a Brinell hardness of at least 300 HB.

Preferably the head has a wearing surface remote from the threaded shaft, the wearing surface being continuous.

In a variation to this aspect of the invention there is provided a fastener element comprising a frusto-conical body and an internally threaded hole extending through the body and substantially parallel to the centre line of the cone shape, wherein the body is hardened to a Brinell hardness of at least 300 HB.

It is typical for the half opening angle of the frusto-conical head/body is within the range of 5° to 20°.

Typically the body has a continuous wearing surface at the largest outer diameter of the body.

According to a further aspect to the present invention there is provided a fastener system comprising:
an elongate shaft; and,
a head portion having a generally annular shape, a hole, and means for engaging the inside of the hole with the shaft, the head portion being engaged with the shaft,
wherein the head portion is relatively harder than the shaft.

Preferably the means for engaging the inside of the hole with the shaft is an internal thread of the hole and an external thread of the shaft.

Preferably the head portion is hardened prior to the head portion being engaged with the shaft, typically by heat treatment. In one embodiment the head portion is hardened to a hardness of at least 300 HB.

Typically the head portion is at least partly frusto-conical in shape.

In one embodiment the smallest diameter of the head portion is larger than the largest diameter of the shaft.

In one embodiment an adhesive is applied to the shaft in the portion of the external thread which engages the internal thread of the head portion. Preferably the adhesive is an anaerobic adhesive.

In one embodiment one end of the shaft is provided with a hole for receiving a tool such that the bolt system can be prevented from rotating during installation of the bolt system.

Typically the thread extends the entire length of the shaft.

According to a further aspect of the present invention there is provided a hardened plate comprising a hole therein for receiving a complementary fastener element for fastening the hardened plate to a work piece, the hole being frusto-conical in shape, wherein the plate has a Brinell hardness of at least 300 HB.

In a variation of this aspect there is provided a hardened plate for cooperating with one or more other plates to form a wear plate layer, the hardened plate comprising:
a hole part on an edge or corner of the plate, the hole part in combination with one or more other hole parts of one or more other hardened plates forming a complete hole, the complete hole being continuously tapered in shape to form a frusto-conical hole, the complete hole for receiving a complementary fastener element for fastening the hardened plate to a work piece,
wherein the hardened plate has a Brinell hardness of at least 300 HB.

Typically the frusto-conical hole has a half opening angle is within the range of 5° to 20°.

Preferably the hole is formed by rotating a high temperature cutting device about a central axis at an acute angle to a surface of the plate.

In one embodiment the hole part is either a half hole or a quarter hole.

In one embodiment the hardened plate comprises at least one beveled edge wherein in use the hardened plate can be arranged such that each of the at least one beveled edge abuts a complementary beveled edge of a like hardened plate. Preferably the angle of inclination of the beveled edge is within the range of +15° to +75°, and wherein the angle of inclination of the complementary beveled edge can be within the range of −75° to −15°. Typically the angle of inclination of the beveled edge is +45°.

In another aspect of the present invention there is provided a hardened plate system for minimising wear on a structural element, the system comprising at least two hardened plates, each having at least one beveled edge and one or more frusto-conical holes for receiving fastening elements,
wherein the hardened plates can be arranged such that the at least one beveled edge of a first hardened plate abuts a complementary beveled edge of a second hardened plate, the fastening elements being provided for securing the hardened plates to the structural element;
wherein the hardened plates have a hardness of at least 300 HB.

Preferably the first hardened plate has a single beveled edge inclined in a first direction.

Typically the second hardened plate has two opposing beveled edges, one beveled edge being inclined in a second direction and the other beveled edge being inclined in a third direction, wherein the angle of inclination of the first direction is complementary of the angle of inclination of the second direction.

Usually the second hardened plate is arranged adjacent to the first hardened plate such that the beveled edge of the first hardened plate abuts and overlaps a beveled edge of the second hardened plate so as to at least partly secure the second hardened plate to structural element.

In one embodiment a third hardened plate may be provided having a beveled edge. Preferably a row of hardened plates can be formed, the row having one first hardened plate and one third hardened plate.

Typically the second hardened plate is disposed between the first and third hardened plates, such that the row of hardened plates comprises three hardened plates.

In one embodiment the row of hardened plates is one of a number of like hardened plates.

Preferably the plates have a Brinell hardness of at least 300 HB.

According to another aspect of the present invention there is provided a method for forming a wear plate, the method comprising:
providing a hardened plate having a Brinell hardness of at least 300 HB; and
creating at least one frusto-conical hole having a half opening angle,
wherein the at least one frusto-conical hole is suitable for receiving a fastener element having a frusto-conical portion complementary to the frusto-conical hole.

Preferably the at least one frusto-conical hole is created by high temperature cutting. Typically the high temperature cutting is achieved using either a plasma cutter or an oxyacetylene cutter.

In one embodiment creating at least one frusto-conical hole comprises:
   providing a plasma cutter;
   inclining the cutting head of the plasma cutter to the half opening angle, relative to the normal of the proximal surface of the hardened plate, of the at least one frusto-conical hole; and
   rotating the cutting head about the hole centre.

In one embodiment creating at least one frusto-conical hole can comprise either creating a complete hole within the hardened plate or creating a part hole on an edge or corner of the hardened plate.

In one embodiment the method further comprises the step of cutting the hardened plate along a line intersecting at least one of the frusto-conical holes to form two or more wear plates having a part hole on an edge or corner of the wear plate.

Preferably the half opening angle of the frusto-conical hole is within the range of 5° to 20°.

In one embodiment the method further comprises:
   beveling at least one beveled edge, and
   wherein the hardened plate can be arranged such that each of the at least one beveled edge abuts a complementary beveled edge of a like hardened plate.

According to a further aspect of the present invention there is provided a method for manufacturing a fastener system, the method comprising the steps of:
   (i) forming a head portion having a generally annular shape and a hole;
   (ii) heat treating the head portion to increase its hardness;
   (iii) providing an elongate shaft; and,
   (iv) engaging the head portion with the shaft to form the fastener system.

Preferably the head portion has an internal thread inside the hole. Preferably the elongate shaft is provided with an external thread. Preferably the head portion is engaged with the shaft by threading the head portion onto the shaft.

Typically step (i) involves machining the outer profile of the head portion, drilling a hole and tapping an internal thread in the hole.

In one embodiment step (iv) involves applying an adhesive to the engaging threads between the head portion and the shaft.

According to another aspect of the present invention there is provided a fixing system for fixing a first element to a second element, the fixing system comprising:
   a frusto-conical hole extending through the first element;
   a first fastener element having a frusto-conical portion which complements the frusto-conical hole, the frusto-conical portion having its largest diameter remote from the second element, the frusto-conical portion having a hardness of at least 300 HB; and,
   a second fastener element having an engagement means for engaging the first fastener element,
   wherein to fix the first and second elements together the first fastener element is positioned such that the frusto-conical portion is located within the frusto-conical hole, and the second fastener element is engaged with the first threaded portion such that the first and second elements are fixed together.

According to yet another aspect of the present invention there is provided a fixing system for fixing a first element to a second element, the fixing system comprising:
   a frusto-conical hole extending through the first element;
   a first fastener element having a frusto-conical portion which complements the frusto-conical hole, the frusto-conical portion having its largest diameter remote from the second element; and,
   a second fastener element having an engagement means for engaging the first fastener element,
   wherein one of the first fastener element and the second fastener element has a shaft extending into the second element,
   wherein the largest diameter of the shaft is less than the smallest diameter of the frusto-conical portion,
   wherein to fix the first and second elements together the first fastener element is positioned such that the frusto-conical portion is located within the frusto-conical hole, and the second fastener element is engaged with the first threaded portion such that the first and second elements are fixed together.

According to a further aspect of the present invention there is provided a fixing system for fixing a first element to a second element, the fixing system comprising:
   a frusto-conical hole extending through the first element;
   a first fastener element having a frusto-conical portion which complements the frusto-conical hole, the frusto-conical portion having its largest diameter remote from the second element, wherein the first element is a plate with a hardness of at least 300 HB; and,
   a second fastener element having an engagement means for engaging the first fastener element,
   wherein to fix the first and second elements together the first fastener element is positioned such that the frusto-conical portion is located within the frusto-conical hole, and the second fastener element is engaged with the first threaded portion such that the first and second elements are fixed together.

Preferably the engagement means is a thread for threadingly engaging a corresponding thread of the first fastener element.

Typically the first fastener element is a bolt and the second fastener element is a nut. Alternatively the first fastener element is a retainer and the second fastener element is a bolt.

Usually the narrowest diameter of the frusto-conical portion is wider than the width of a shaft of the bolt.

Typically the frusto-conical portion of the bolt is hardened, preferably to a hardness of at least 300 HB.

Preferably the depth of the frusto-conical head is approximately equal to the thickness of the first element about the frusto-conical hole.

In some embodiments additional fastening elements and/or washers may be used in the fixing system.

Typically when the first fastener element is located within the frusto-conical hole, the frusto-conical portion of the first fastener element is flush with a wearing surface of the first element.

In a further aspect of the present invention there is a fastener element comprises a frusto-conical portion and a threaded portion, wherein the smallest outer diameter of the frusto-conical portion is adjacent the threaded portion, and the largest outer width of the threaded portion is smaller than the smallest outer diameter of the frusto-conical portion.

BRIEF DESCRIPTION OF THE DRAWINGS

In order for the invention to be more easily understood, embodiments will now be described, by way of example only, with reference to the accompanying drawings, in which:

FIG. 9 is a schematic cross section view of a second embodiment of a fixing system according to the present invention;

FIG. 10 is a cross section of an elevation of a retainer of the fixing system as shown in FIG. 9;

FIG. 11 is a bottom view of the retainer of FIG. 10;

FIG. 20 is an exploded view of a fastener system according to another embodiment of the present invention;

FIG. 21 is a cross section view of the fastener system of FIG. 20;

FIG. 22 is an end view of the fastener system of FIG. 20;

FIG. 24 is a side view of a fastener system according to a fastener embodiment of the present invention;

FIG. 25 is an end view of the bolt system of FIG. 23;

FIG. 26 is an exploded view of the bolt system of FIG. 23; and,

DETAILED DESCRIPTION OF THE PREFERRED EMBODIMENTS

Figure 4:
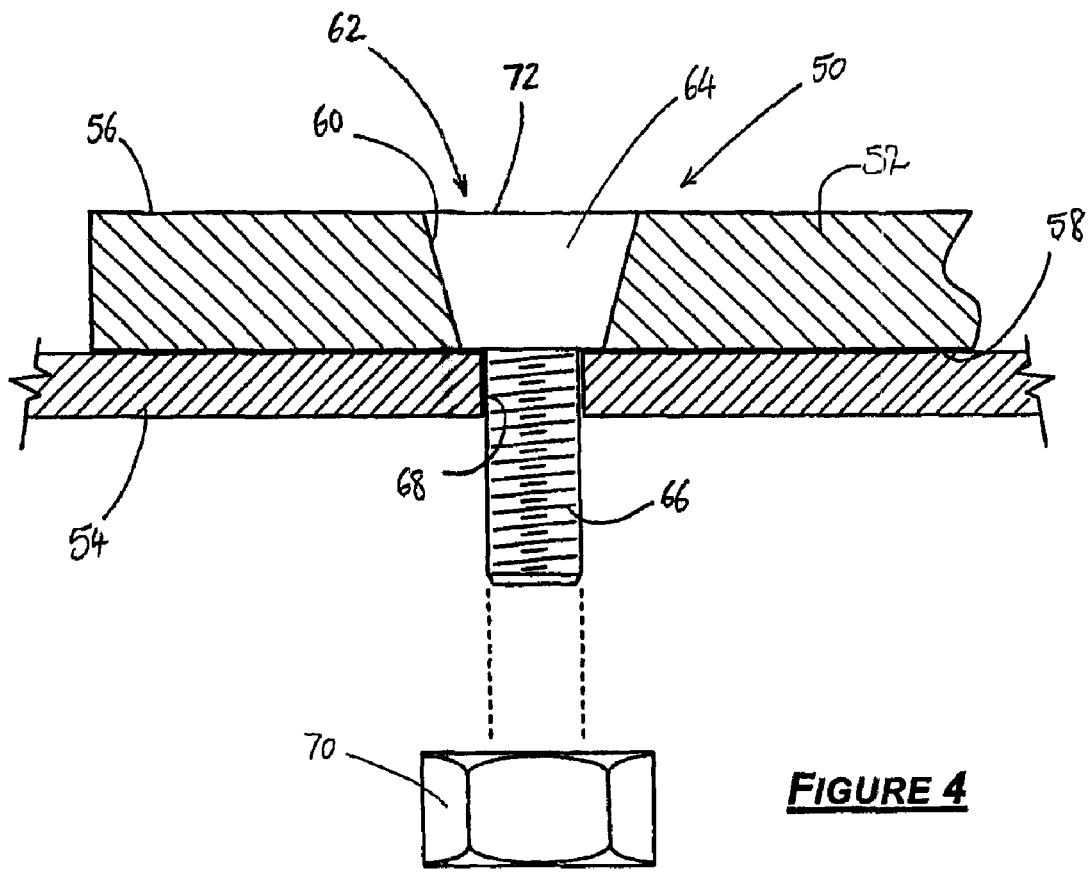
FIG. 4 is a schematic cross section view of a first embodiment of a fixing system according to the present invention.

FIG. 4 shows a schematic cross sectional view of a fixing system 50 according to one embodiment of the present invention. The fixing system 50 fixes a first element, such as a wear plate 52 to a second element, which may be a structural element 54 such as the wall of a hopper or the bin of an earth moving truck or other equipment. The wear plate 52 has a first surface 56 which is exposed to wear, and a second surface 58 which, in use, abuts the structural element 54.

The wear plate 52 is made of a wear resistant material having a Brinell hardness of at least 300 HB. Typically BIS-ALLOY 500™ or similar is used, which has a typically Brinell hardness of 500 HB.

A fastener, such as bolt 62, having a head 64 and a threaded shaft 66, is used to secure the wear plate 52 to the structural element 54. The threaded shaft 66 extends through a hole 68 in the structural element 54. A nut 70 is threaded onto the shaft 66 to fix the wear plate 52 to the structural element 54. It will be appreciated that additional nuts and/or washers may be used in combination with the nut 70. Alternatively, the hole 68 in the structural element 54 may be internally threaded to engage the threaded shaft 66. In this alternative, the head 64 of the bolt 62 may be provided with, for example, a hexagonal hole to allow the bolt 62 to be rotated. Further alternative means of securing the fastener with out use of a nut will be evident to the skilled addressee.

Figure 5:
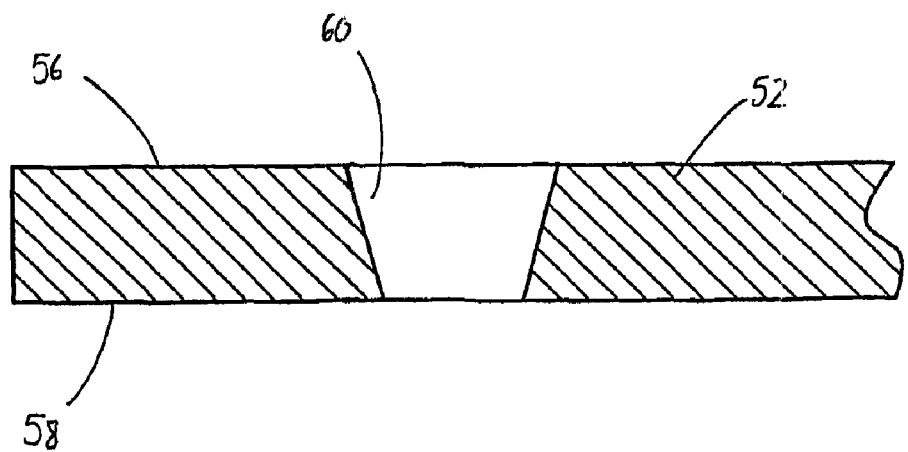
FIG. 5 is a cross section view of the wear plate of FIG. 4.

As shown in FIG. 5, the wear plate 52 is provided with a hole 60 which is frusto-conical in shape such that the diameter of the opening on the first surface 56 is larger than that on the second surface 58. The hole 60 can easily be formed in the material of the wear plate 52 using, for example, a plasma cutter or an oxyacetylene cutter. Where a plasma cutter is used, the hole 60 may be formed by inclining the head of the plasma cutter at an angle corresponding with the half opening angle of the desired frusto-conical shape for the hole 60 and then rotating the head of plasma cutter about the centre line for the hole 60.

The hole 60 may be formed such that the cut is made from the second surface 58 toward the first surface 56. Cutting in this manner minimises the exposure of the first surface 56 to heat during cutting which may result in deterioration of the wear plate 52 material.

Figure 3:
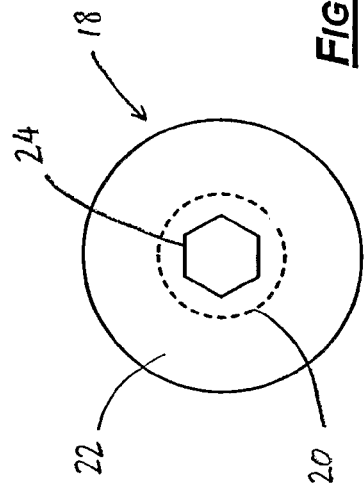
FIG. 3 is a plan view of the counter-sunk bolt of FIG. 2.
Figure 2:
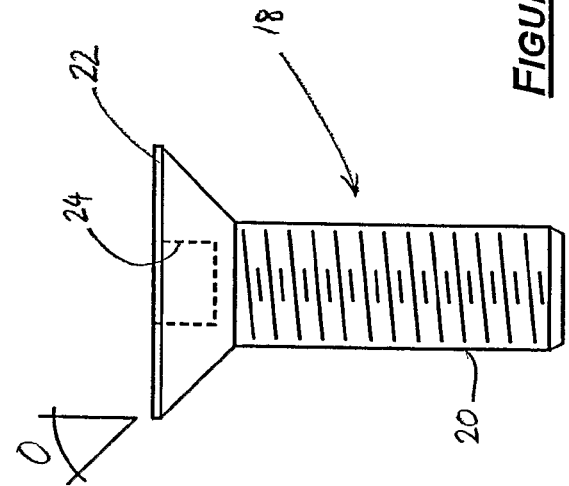
FIG. 2 is an elevation view of counter-sunk bolt which is used in conjunction with the wear plate of FIG. 1.
Figure 1:
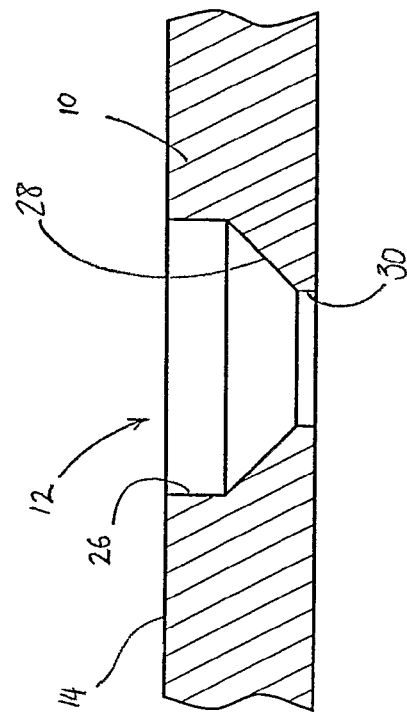
FIG. 1 is a cross section of a wear plate according to a prior art fixing system.

Forming the known wear plate 10 as shown in FIG. 1 involves separate equipment to perform the cutting operation and the drilling operation. This would obviously involve significant handling time in transferring the plate from a cutting station to a drilling station. In addition, the drilling operation would take at least approximately 10 minutes per hole and could take up to 30 minutes including set up time. As discussed above, drilling the hole 12 requires the use of special drill bits. In addition, a coolant fluid must be used to remove heat generated during the drilling operation.

A plasma cutter can be computer numerically controlled, allowing the cutting and hole-forming operations to be performed at the same station. Using a plasma cutter, the hole 60 can be created in approximately 10 seconds. These time savings will ultimately result in significant cost savings.

In one alternative, the circumferential surface 65 of the head 64 may be provided with at least partly radially protruding ramps (not shown) which engage the wear plate 52 about the hole 60 as the head 64 is inserted into the hole 60. During the working life of the fixing system 50, the ramps resist any unintended rotational movement of the bolt 62 within the hole 60.

Alternatively or additionally, where a plasma cutter is used to create holes 60, the cutting operation will often result in grooves being formed on the surface of the cut. These grooves can engage, for example, the head 64 of the bolt 62 and provide resistance to any unintended rotational movement of the bolt 62 within the hole 60. Corresponding grooves could be formed on the head 64 of the bolt 62.

Figure 17:
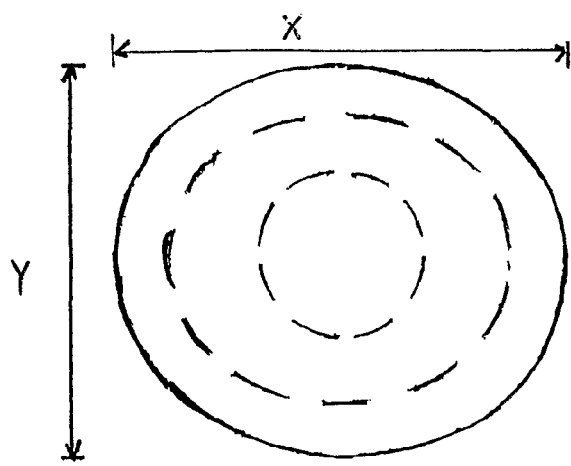
FIG. 17 is a top view of an alternative embodiment of a bolt according to the present invention.
Figure 18:
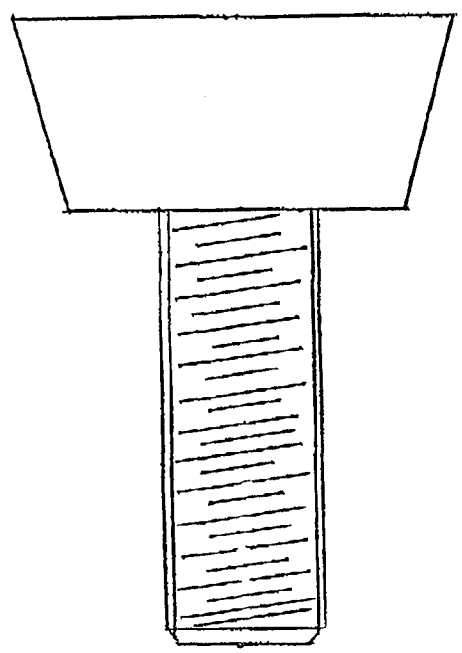
FIG. 18 is a side view of the alternative embodiment of a bolt of FIG. 17.
Figure 19:
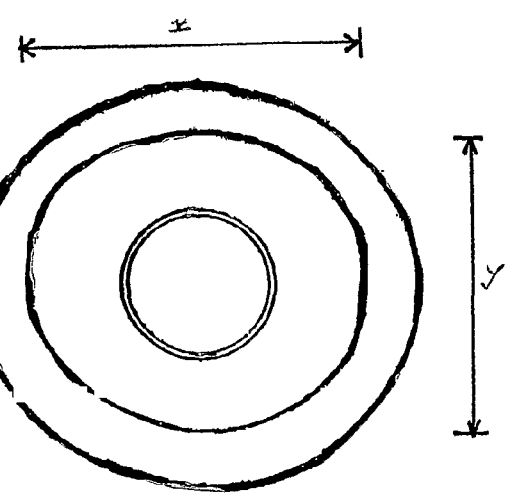
FIG. 19 is a bottom view of an alternative embodiment of a bolt of FIG. 17.
Figure 23:
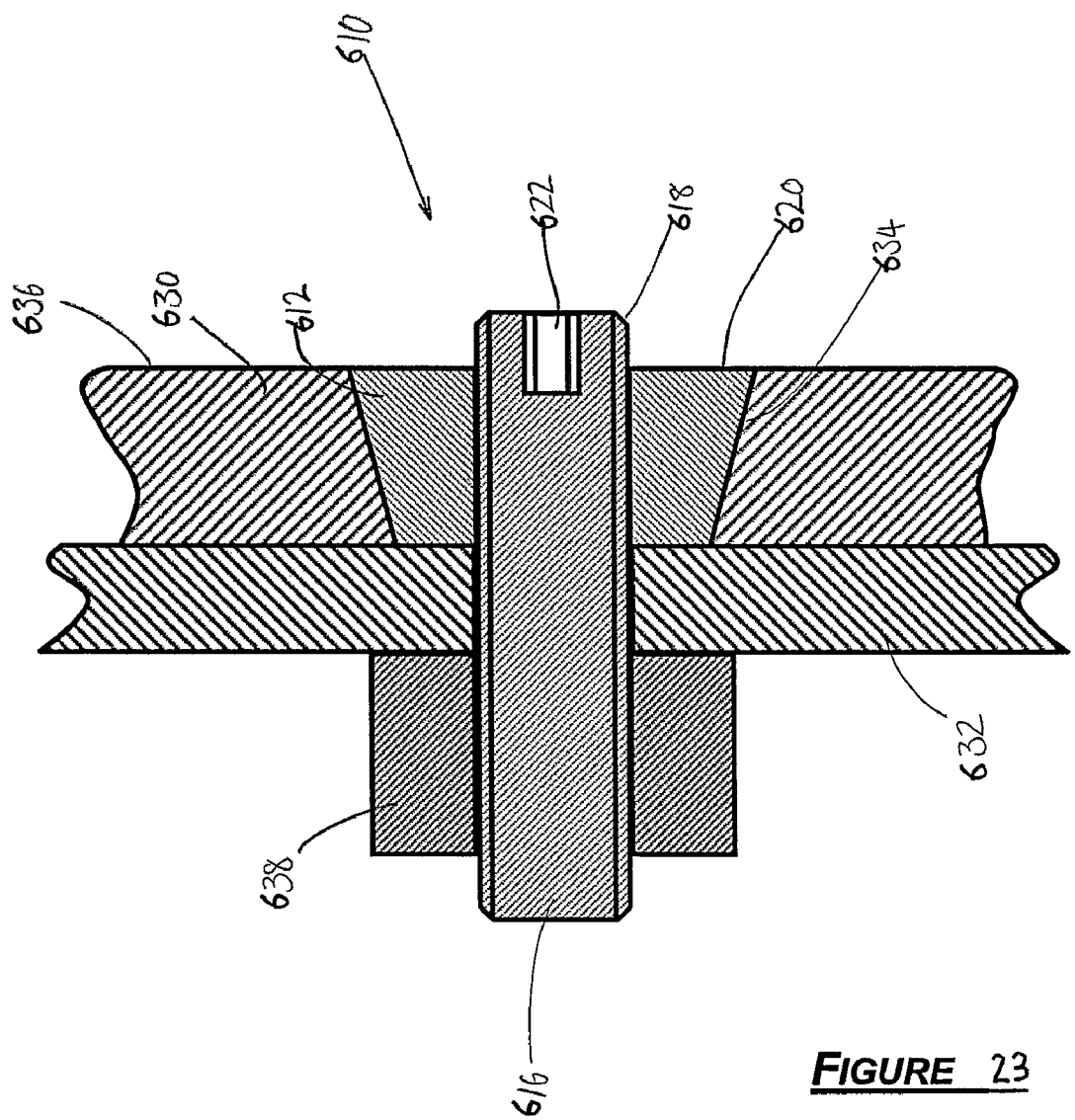
FIG. 23 is a cross section of the fastener system of FIG. 20 together with a nut fastening a wear plate to a structural element.

In yet another alternative the head may be oval shaped in perpendicular cross section as shown in FIGS. 17 to 19. In this embodiment the semi-major axis x of the top of the head is greater than the semi-major axis y. For example x may be 47 mm and y may be 45 mm. The semi-major axis x of the bottom of the head is also greater than the semi-minor axis y. For example x may be 37 mm and y may be 35 mm. The hole in the wear plate would ideally be correspondingly oval shaped. This embodiment has the advantage of preventing rotation of the bolt when it is seated in the hole. For the avoidance of doubt, the term frusto-conical is intended to cover a frustum part of a cone which is not necessarily a right circular cone, such as where the base of the cone is oval shaped.

Figure 6:
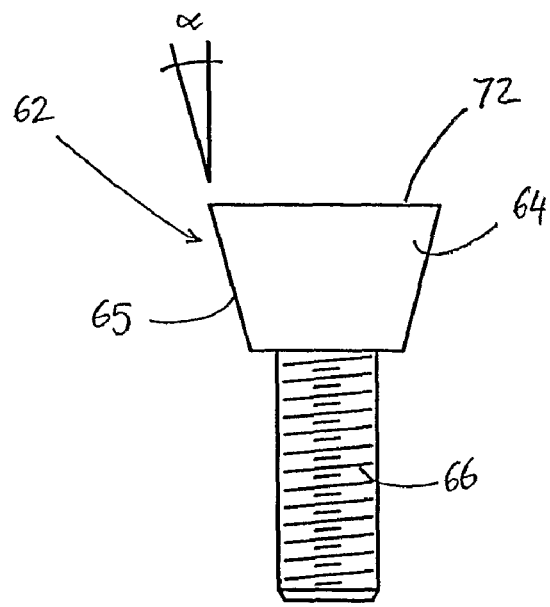
FIG. 6 is of an elevation view of an embodiment of a bolt according to the present invention used in the fixing system of FIG. 4.
Figure 7:
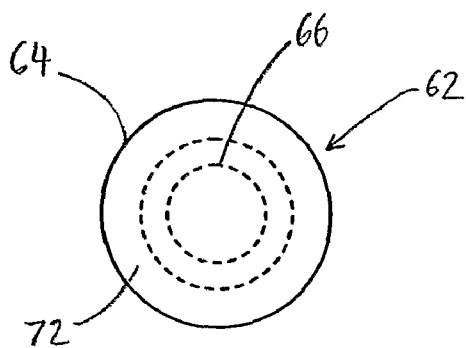
FIG. 7 is a plan view of the bolt of FIG. 6.
Figure 8:
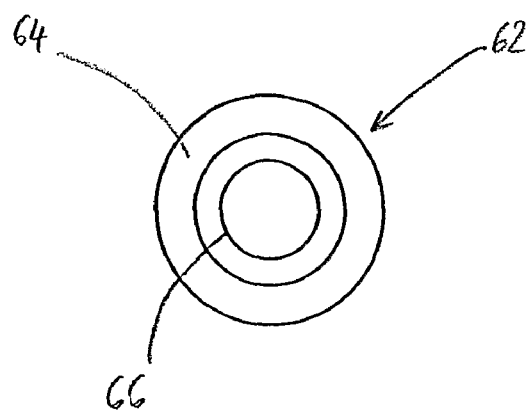
FIG. 8 is a bottom view of the bolt of FIG. 6.

FIGS. 6 to 8 show the bolt 62. The head 64 of the bolt 62 is also frusto-conical in shape to compliment the shape of the hole 60. The half opening angle α of the conical frustum in each of the hole 60 and the head 64 is, in this embodiment, 15°. However, it will be appreciated that the angle α would be greater than or equal to about 5° and usually less than or equal to about 20°. Angles larger than 20° will work, but are less desirable. The head 64 is machined and hardened such that it resists wear. In addition, the top surface 72 of the bolt 62 is substantially flat.

The process of forming the bolt 62 may involve through hardening (that is, quenching and tempering) of at least the head 64.

Typically, the head 12 will be of a hardness comparable to the hardness of the object being fastened by the bolt system 10 in use. Where the bolt system 10 is used to fasten the hardened wear plate 30 to the structural element 32, the head 12 would be hardened to a Brinell hardness of 300 HB or more, preferably 350 HB or more.

In a preferred embodiment, the head 12 would be of a hardness more than the hardness of the wear plate. For example, when used to secure wear plate of a hardness of 350 HB, then the hardness of the head 12 would be about 400 HB. Where the wear plate has a hardness of 500 HB the head 12 is hardened to at least 500 HB, preferably harder.

It is noted that cutting the hole 60 may leave imperfections in the surface forming the hole 60. To alleviate problems that may arise from the bolt 62 from not seating correctly in the hole 60 due to these imperfections, the half opening angle of the conical frustum of the hole 60 may be slightly greater than the half opening angle α of the head 64 of the bolt 62. The difference may be about 1-2° or less. This will allow the base of the head 64 to engage with the base of the hole 60 first. Slight deflection of the hole surface/head will allow for an increase in the area of contact as the nut 70 threaded on the bolt is tightened. Furthermore any gap left will be relatively small and is likely to be filled with fines from the inside of the bin/hopper which will act as a cement further increasing holding ability of bolt 62.

To assemble the fixing system 50, the holes 60, 68 are aligned and the shaft 66 is inserted through both holes 60, 68. The nut 70 is then threaded onto the shaft 66 and tightened. The head 64 becomes wedged in the hole 68 as the nut is tightened. Because the half opening angle α of the conical frustum of each of the hole 60 and the head 64 is shallow, the friction between the head 64 and the wear plate 52 rises rapidly. This friction is usually sufficient to prevent the bolt 62 from rotating as the nut 70 is rotated to tighten/loosen the clamping force.

As shown in FIG. 4, the depth of the frusto-conical head 64 is preferably approximately equal to the thickness of the wear plate 52 about the hole 60.

Furthermore, as shown in FIG. 4, when the fixing system 50 is assembled the top surface 72 of the bolt 62 is substantially flush with the first surface 56 of the wear plate 52.

The fixing system 50 of the present invention is advantageous over the existing fixing systems for hardened plates because the method of forming the hole in the plate is considerably easier, quicker and requires less expensive equipment. The new bolt of the present invention is just as effective in fastening the hardened plate and can be used with the new hole in the hardened plate of the present invention.

In FIG. 9, a fixing system 150 according to a second embodiment is shown. The fixing system 150 fixes a first element, such as a wear plate 152, to a second supporting or structural element 154. The wear plate 152 has a first surface 156 which is exposed to wear, and a second surface 158 which, in use, abuts the structural element 154.

A hole 160, of frusto-conical shape, is provided in the wear plate 152. The diameter of the opening on the first surface 156 is larger than that on the second surface 158. The fixing system 152 includes an retainer 162 having a frusto-conical shape which complements that of the hole 160. The retainer 162 may be selected to have a depth equal to the thickness of the wear plate 152. An internally threaded hole 164 extends through the retainer 162. The same slight difference in angles between the head of the bolt and the hole may be employed with the nut and the hole to alleviate problems caused by imperfections in the surface of the hole.

To fix the wear plate 152 to the structural element 154, a bolt 170, having an externally threaded shaft 172, is inserted through a hole 168 in the structural element 154. The thread on the shaft 172 engages the internal thread of the retainer 162. The retainer 162 is drawn into the hole 160 in the wear plate 152 as the bolt 170 is threaded into the retainer 162.

The friction force between the retainer 162 and the wear plate 152 increases with the tensile force along the shaft 172. Thus, as the bolt 170 is tightened the friction force will prevent the retainer 162 from rotating.

As shown in FIG. 10, the half opening angle β of the conical frustum in each of the hole 160 and the head 162 is, in this embodiment, 15°. However, it will be appreciated that the angle β will usually be in the range of 5° to 20°.

FIGS. 10 and 11 show a cross section view and bottom plan view of a retainer 262 according to another embodiment. In this embodiment, the internally threaded hole 264 is offset with respect to the centre of the retainer 262. In some cases, the hole 168 in the structural element 154 may not line up with the hole 160 in the wear plate 152. The retainer 162 can be rotated prior to engagement with the bolt 170, thus aligning the centre of the holes 160, 162.

It will be appreciated that the threaded shaft 172 may be longer than the combined thickness of the wear plate 152 and the structural element 154. Accordingly, once the fixing system 150 is assembled, the threaded shaft 172 may protrude from the top surface 166 of the retainer 162. The protruding portion will wear away until the threaded shaft 172 and the retainer 162 are flush at the top surface 166.

Figure 12:
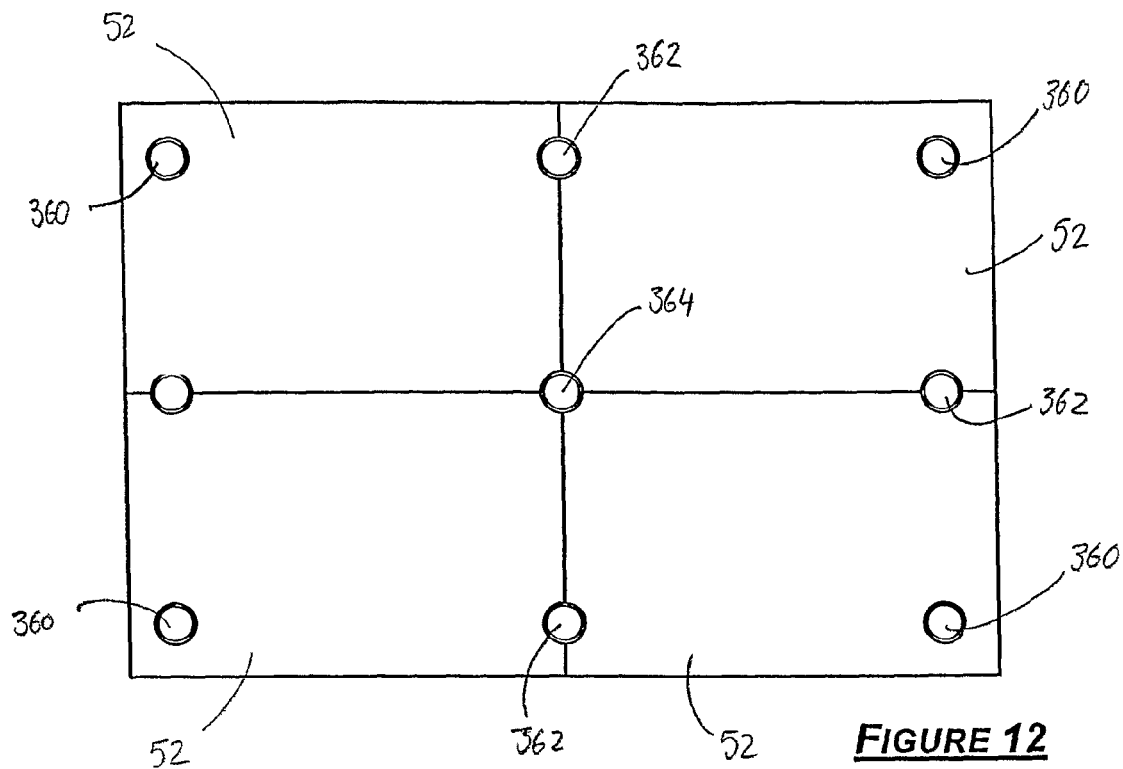
FIG. 12 is a schematic plan view of four wear plates according to an embodiment of the present invention.
Figure 13:
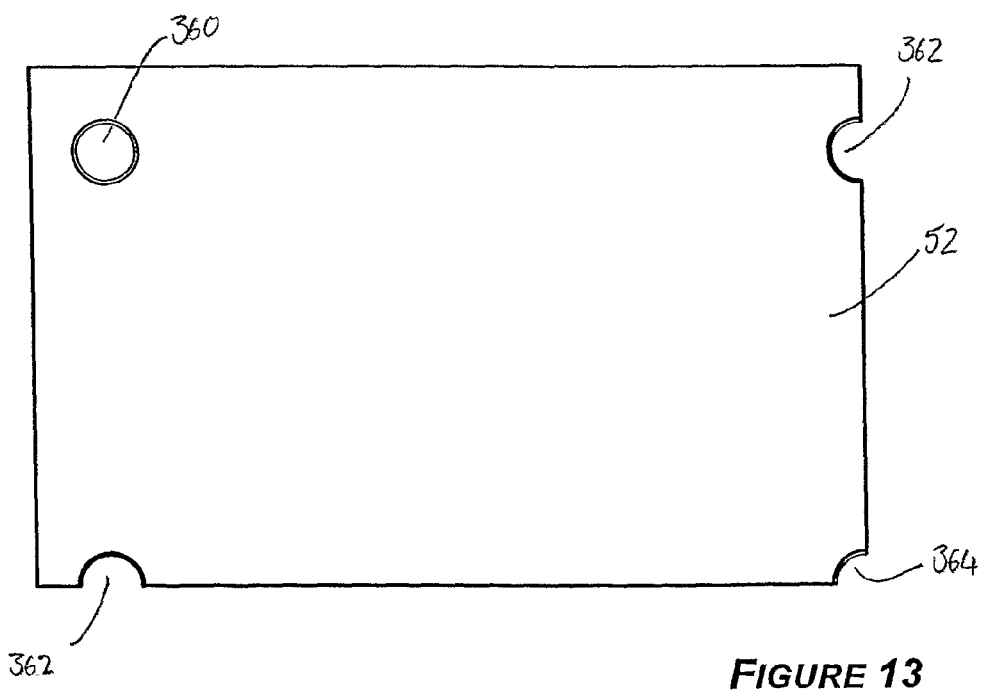
FIG. 13 is a schematic plan view of a wear plate of FIG. 12.

FIG. 12 is a plan view showing schematically four wear plate 52 "tiled" together over a structural element (not shown). FIG. 13 is a plan view of one such wear plate 52. As shown in FIG. 13, there are three types of holes in the wear plates 52. The first, a complete hole 360 provided within the wear plate 52; a second, half hole 362 provided on an edge of the wear plate 52; and, a third, quarter hole 364 provided on a corner of the wear plate 52. As shown in FIG. 13, two half holes 362 can be aligned to receive either the head 64 of a bolt 62 or a retainer 162. Similarly, four quarter holes 364 can be aligned to receive either the head 64 of a bolt 62 or a retainer 162. While not shown in the figures, a half hole 362 and two quarter holes 364 may be aligned.

It will be appreciated that variations of wear plates 52 can be formed. For example, wear plates 52 may be formed having any combination of complete holes 360, half holes 362 and quarter holes 364 as required. Furthermore, it will be appreciated that, where wear plates 52 having half holes 362 and/or quarter holes 364 are used, it will be necessary to provide lateral support to prevent the wear plates 52 separating. Such lateral support may be provided by complete holes 360 and/or external supports. The location and number of the complete holes 360 would be determined by the lateral support required, and the shear stress applied to the shafts 72, 172 of the bolts 70, 170 within those complete holes 360.

An example of one method of forming individual wear plates 52 can be described in connection with the wear plates 52 shown in FIG. 13, as follows:

1. providing a large plate of hardened material;
2. forming nine holes in the large plate using, for example, a plasma cutter;
3. cutting the large plate along two orthogonal lines which intersect the holes to form four wear plates 52, each having a complete hole 360, two half holes 362 and a quarter hole 364.

Obviously, other combinations of holes and cuts, and the number of wear plates 52 formed can be created as desired. It will be appreciated that some allowance for loss of material may be required when cutting the plate through the holes formed in step 2 of the method described above. Thus, for example, the size and/or shape of the holes formed in step 2 may need to be adjusted.

It will be understood to persons skilled in the art that the fixing system may be used in applications where access to the bolt head can be impeded during the service life of the bolt. Furthermore, the hardened plate may be other material.

In the embodiment shown in FIGS. 9 and 10, the internally threaded hole 164 in the retainer 162 extends through the retainer. Alternatively, the hole 164 may be a blind hole such that the bolt 170 only extends part way into the retainer 162. In this alternative embodiment, a hexagonal hole, for example, may be provided which extends into the retainer 162 from the top surface 166. Accordingly, an Allen key may be inserted into the retainer 162 to assist preventing the retainer 162 from rotating during assembly of the fixing system 152. This embodiment of the retainer is useful where an externally threaded stud is fixed to the structural element and inserted through the hole 160 to perform the role of the bolt 170.

Figure 14:
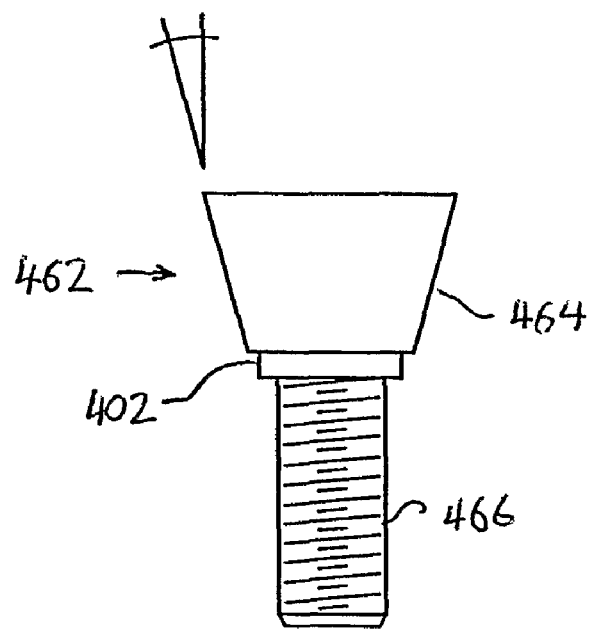
FIG. 14 is a side elevation of an alternative embodiment of a bolt according to the present invention.

Referring to FIG. 14 a variant of the bolt shown in FIG. 6 is shown. In this variant bolt 462 has a shoulder or step 402 between the head 464 and the threaded pull shaft 466. The step 402 is typically sized to fit within the hole 68. This allows for a larger sized bolt head and step which is more resistant to shearing forces.

Figure 15:
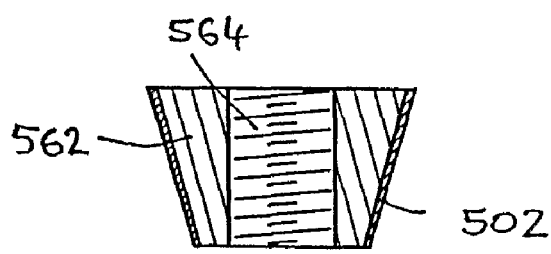
FIG. 15 is a cross sectional side elevation of a retainer according to the present invention, with a coating applicable to fastener elements of the present invention.
Figure 16:
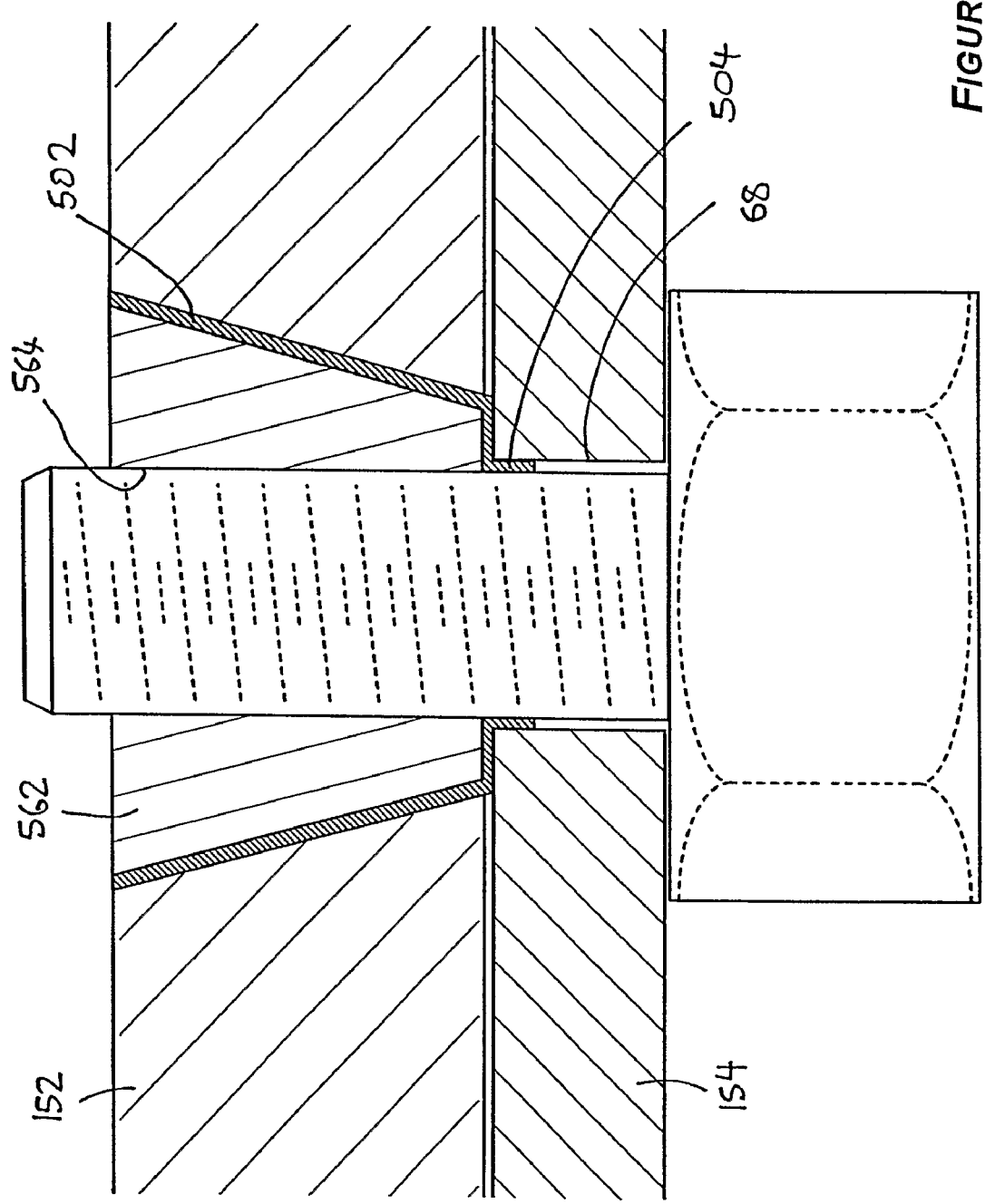
FIG. 16 is a schematic representation of the retainer of FIG. 15 in use.

Referring to FIGS. 15 and 16, which show a variant retainer 162. The variant retainer 162 is the same as retainer 162 except it has a hard plastic coating 502. As seen in FIG. 16 as the clamping force is applied to the retainer it causes the plastic 502 to flow into the hole 68 as indicated by 504. This provides a seal through the hole 68. The same coating can also be applied to bolt 162 or 462 so that the respective coating can also flow into the hole 68 in the supporting element 154. This is useful where materials having a high sulphide content exposed to water. This can produce an acidic liquid that if it flows through the hole 68 it can damage the supporting structure and/or components behind the supporting structure.

FIGS. 20 to 23 show a fastener system 610 according to another embodiment of the present invention. The fastener system 610 can be in the form of the threaded bolt 62 having an external thread for engaging an internally threaded nut. However the fastener system 610 can be in the form of a fastener without thread remote from a head 612. In this embodiment the fastener system 610 is a bolt system and comprises a heat treated head 612 of generally annular shape and having an internally threaded hole 614, and an externally threaded shaft 616. The bolt system 610 is used, in combination with a nut 638 to fastening, for example, a hardened wear plate 630 to a structural element 632. It will be appreciated that is fastener system need not be exclusively used for wear plates.

The head 612 is through hardened to reduce the rate of wear due to abrasion. It will be appreciated that the head 612 can be initially formed to shape and subsequently hardened to the desired hardness. The shaft 616 can be made of a mild steel.

Typically, the head 612 will be of a hardness comparable to the hardness of the object being fastened by the bolt system 10 in use. As before, where the bolt system 10 is used to fasten the hardened wear plate 630 to the structural element 32, the head 12 would hardened to a Brinell hardness of 300 HB or more, preferably 350 HB or more.

Preferably, the head 612 would be of a hardness more than the hardness of the wear plate.

The bolt system 610 is assembled by threading the head 612 onto the shaft 616. Typically an adhesive is applied to the engaging threads of head 612 and shaft 616. The adhesive is preferably an anaerobic adhesive, such as a thread locker. As shown in FIG. 21, the head 612 is threaded onto the shaft 616 such that, immediately after assembly, an end portion 618 of the shaft 616 extends beyond surface 620 of the head 612.

The head 612 in this embodiment has a frusto-conical shape such that the head 612 can be received in a complementary hole 634 in the hardened wear plate 630. When the head 612 is located within the hole 634 in the hardened wear plate 630, the surface 620 of the head 612 is approximately flush with the wearing surface 636 of the wear plate 630. Accordingly, the end portion 618 of the shaft 616 will protrude from the wearing surface 636. As the shaft 616 is made of a mild steel, in use the end portion 618 will quickly wear to approximately the level of the wearing surface 636.

The end portion 618 of the shaft 616 can optionally be provided with a hexagonal hole 622 which can receive an Allen key. Thus, during installation, the bolt system 610 can be prevented from rotating as a fastener is threaded onto the shaft 616.

FIGS. 24 to 27 show a bolt system 710 according to a second embodiment of the present invention. The bolt system 710 comprises a head 712 and an externally threaded shaft 716. As shown in FIG. 26, the head 712 is generally annular in shape and the head 712 has an internally threaded hole 714 for receiving the shaft 716.

The bolt system 710 is assembled in the same manner as the bolt system 610 of the previous embodiment. That is, the head 712 is threaded onto the shaft 716 and an adhesive is applied to the engaging threads of head 712 and shaft 716.

The head 712 is shaped such that there is a cylindrical portion 724 and a frusto-conical portion 726. In use, the head 712 is received in a hole 734 having complementary shape in a wear plate 730.

Figure 27:
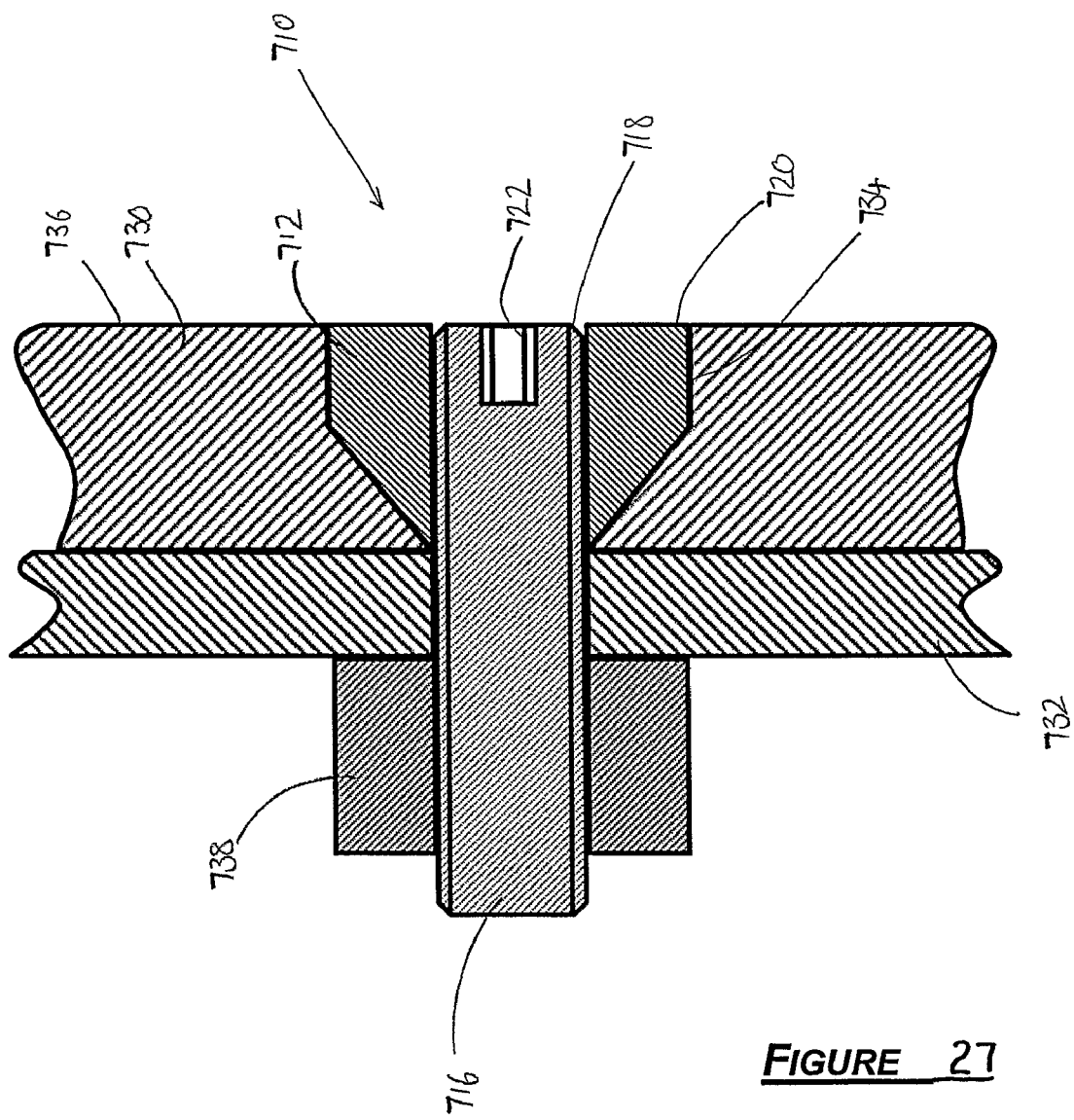
FIG. 27 is a cross section of the bolt system of FIG. 23 together with a nut fastening a wear plate to a structural element.

As shown in FIG. 27, the bolt system 710, in combination with a nut 738, applies a clamping force to the wear plate 730 and a structural element 732.

The head 712 can be threaded onto the shaft 716 such that the end portion 718 is substantially flush with the wearing surface 720 of the head 712. It will also be appreciated that in an alternative embodiment the head may be threaded onto the shaft such that the end portion is recessed with respect to the wearing surface of the head. While this alternative embodiment is feasible, it is less desirable since there will be fewer engaging threads between the head and the shaft.

The bolt systems 610, 710 can both be manufactured by:
(i) forming a head portion 612, 712 having a generally annular shape and an internally threaded hole 614, 714, by machining the outer profile of the head portion, drilling a hole and tapping an internal thread in the hole;
(ii) heat treating the head portion 612, 712 to increase its hardness;
(iii) providing an externally threaded elongate shaft 616, 716; and, (iv) threading the head portion 612, 712 onto the shaft 616, 716 to form the bolt system 610, 710 and applying an adhesive to the engaging threads between the head portion 612, 712 and the shaft 616, 716.

Thus, the head portion 612, 712 is formed separately of the shaft 616, 716. This can be of advantage where it is desirable for the bolt head to be hardened, but for the shaft of the bolt to retain ductile.

It will be understood to persons skilled in the art of the invention that many modifications may be made without departing from the scope of the invention.

Instead of hexagonal hole 622, the end portion shaft can be provided with an alternative means for holding the bolt system 610, 710 from rotating during installation. Parallel flats sections can be on either side of the shaft 616, 716 for bearing against an open ended spanner or similar tool. Alternatively, a hole may be provided to receive a tool, such as a Torx® drive. In a further alternative, a threaded element is temporarily threaded onto the end portion 618, 718 to abut the surface 620, 720 of the head 612, 712. The threaded element has a handle means for applying a torque to oppose rotation of the bolt system 10, 110 during installation. It will further be appreciated that embodiments of the bolt system may be provided in which friction between the head and the wear plate are used to prevent rotation of the bolt system during installation.

Figure 28:
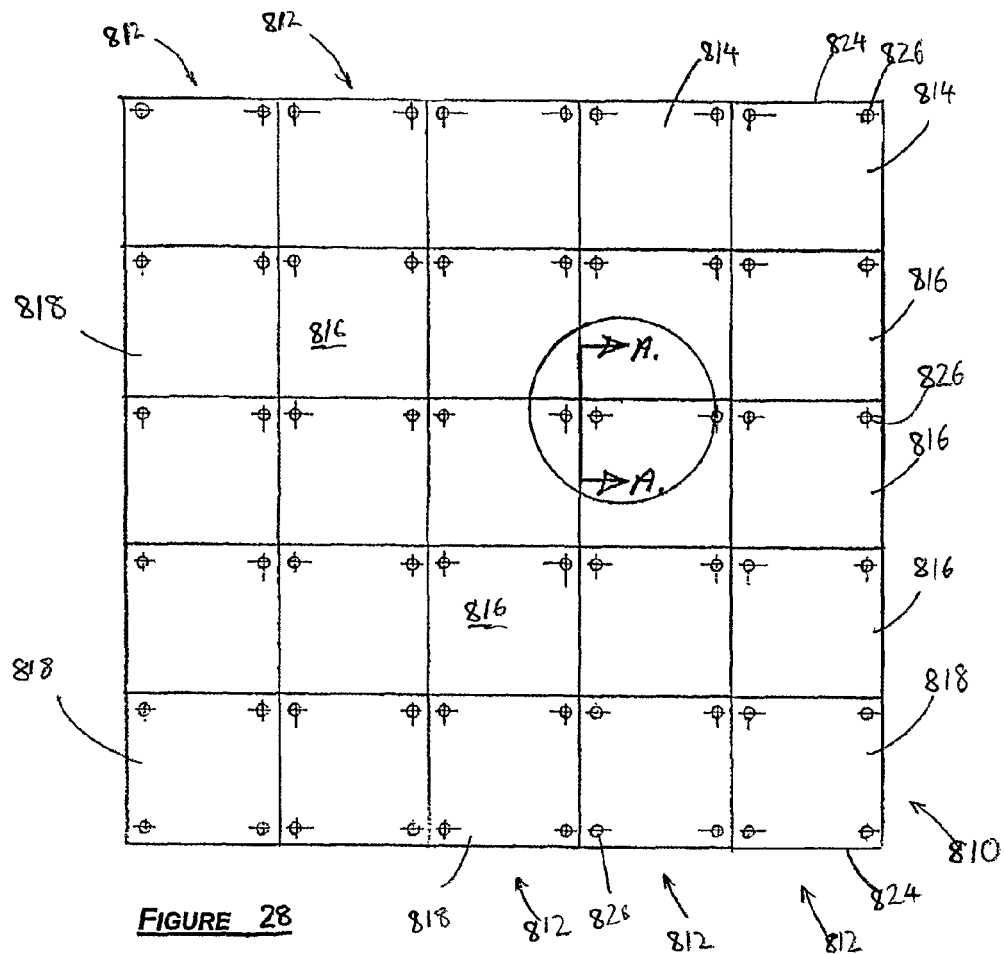
FIG. 28 is a plan view of a wear plate system according to yet another embodiment of the present invention.
Figure 29:
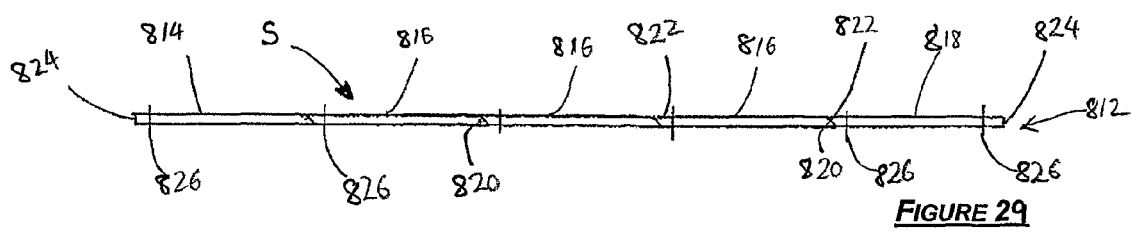
FIG. 29 is a side view of the wear plate system of FIG. 28.
Figure 30:
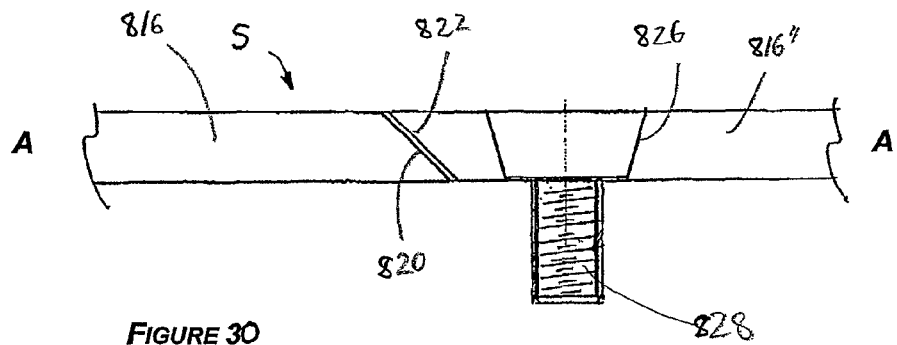
FIG. 30 is a schematic side view of the wear plate system as viewed along the line A-A in FIG. 28.

FIGS. 28 to 30 show a wear plate system 810 which is used to prevent wear on a surface of a structural element (not shown). The wear plate system 810 has a number of rows 812, each of which has a number of hardened plates such as wear plates 814, 816, 818 that provide a continuous cover. The wear plates 814, 816, 818 are exposed to wear rather than the structural element and are as described above. As such, the wear plates 814, 816, 818 are sacrificial elements. Each row 812 consists of a top wear plate 814, a number of intermediate wear plates 816 and a bottom wear plate 818.

As shown in FIG. 92, each wear plate 814, 816, 818 has at least one beveled edge 820, 822. The direction of inclination of the beveled edges of adjacent wear plates is such that there is overlap of one wear plate an adjacent wear plate within the same row 812. For example, as shown in FIG. 30, one intermediate wear plate 816' has a beveled edge 820 which is positively inclined while the adjacent intermediate wear plate 816" has a beveled edge 822 which is negatively inclined. The beveled edge 822 is complementary of the beveled edge 820, such that a substantially flat wearing surface S of the wear plate system is formed by the wear plates 814, 816, 818.

In the embodiment shown in FIGS. 28 to 30, the angle of inclination of the beveled edges 820, 822 is −45° and +45°, respectively, to the normal to the wear surface S. Accordingly, each intermediate wear plate 816 is provided with a positively inclined beveled edge 820 and a negatively inclined beveled edge 822.

The top wear plate 814 is provided with a single positively inclined beveled edge 820, while the bottom wear plate 818 is provided with a single negatively inclined beveled edge 822. The opposite edge 824 of each of the top and bottom wear plates 820, 822 have substantially no inclination.

To secure the wear plates to the structural element, the top wear plate 814 and each intermediate wear plate 816 is provided with two holes 826, while the bottom wear plate 818 is provided with four holes 826. Each hole 826 is provided with a fastening element 828.

The combination of the fastening elements 828 and the overlapping of the wear plates 814, 816, 818 secure the top wear plates 814, 816, 818 to the structural element.

As the bottom wear plate 818 overlaps on top of the adjacent intermediate wear plate 816, the bottom wear plate 818 is provided with four holes 826 for receiving four fastening elements 828.

The fastening elements 828 depicted in the figures are bolts as above. Accordingly, the holes 826 are frusto-conical in shape. It will be appreciated that other alternative fastening elements may be used and that the holes 826 will be shaped to receive the fastening element.

The side edges 830 of each wear plate 814, 816, 818 which are not adjacent to another wear plate 814, 816, 818 within the same row 812 have no inclination.

The wear plate system 810 of the present invention, when compared with the standard wear plate attachment arrangement, uses fewer bolts. Accordingly, for the present invention there is reduced time for fixing the wear plate system 810 to a structural element.

It will be understood to persons skilled in the art of the invention that many modifications may be made without departing from the spirit and scope of the invention. For example, the angle of inclination of the beveled edges can alter, providing that the modulus of the two angles add up to 90°. In another embodiment, the beveled edge 820 may be positively inclined to +20° to the normal to the wear surface S, while the (complementary) beveled edge may be negatively inclined to −70°. This arrangement is satisfactory since: |20°|+|−70°|=90°. The beveled edge may be in the range of 15° to 75°. Accordingly, a complementary beveled edge may be in the range of 75° to 15°.

Furthermore, the person skilled in the art will also appreciate that the wear plate system may be arranged such that adjacent rows have overlapping edges.

The wear plates 814, 816, 818 according to the embodiment shown in the figures are generally square in shape. It will be appreciated that wear plates may be provided in other shapes. For example, the wear plates may be other quadrilateral shapes (such as rectangular, or a non-regular quadrilateral), or triangular.

While the term frusto-conical has been used in the specification in connection with conical portions having a circular cross section, it will be appreciated that other cross sections may be employed such as elliptical or a polygon.

Throughout this specification, except where the context requires otherwise due to express language or necessary implication, the words "comprise" or variations such as "comprises" or "comprising" are used in an inclusive sense; that is, to specify the presence of the stated features but not to preclude the presence or addition of further features in various embodiments of the invention.

The claims defining the invention are as follows:

1. A method of manufacturing one or more wear plates comprising the steps of:
   providing a large plate of material with a Brinell hardness of at least 300 HB, the large plate having opposite planar first and second surfaces and being dimensioned to have a surface area equal to or larger than a surface area of the one or more wear plates being manufactured;
   providing a computer controlled plasma cutter;
   entering desired hole locations of holes required in the one or more wear plates in the computer controlled plasma cutter;
   operating the plasma cutter to cut holes in the large plate at the desired locations, each hole having a frusto-conical configuration with a small diameter end and a large diameter end, and each small diameter end opening onto the first planar surface of the large plate and each large diameter end opening onto the second planar surface of the large plate; and operating the plasma cutter to cut the large plate into the one or more wear plates, wherein each wear plate includes at least one of the holes or at least a part of one of the holes.

2. The method according to claim 1, wherein the step of operating the plasma cutter to cut the holes comprises operating the plasma cutter to cut the holes in a direction from the first planar surface to the second planar surface.

3. The method according to claim 1, wherein the step of operating the plasma cutter to cut the large plate into one or more wear plates comprises operating the plasma cutter to cut the large plate in a plane inclined to normal of the large plate to create complimentary beveled edges on the wear plates.

4. A method of protecting a surface of a structure from abrasive wear comprising the steps of:

providing a large plate of material with a Brinell hardness of at least 300 HB, the large plate having opposite planar first and second surfaces and being dimensioned to have a surface area equal to or larger than a surface area of one or more wear plates;

providing a computer controlled plasma cutter;

entering desired hole locations of holes required in the one or more wear plates in the computer controlled plasma cutter;

operating the plasma cutter to cut holes in the large plate at the desired locations, each hole having a frusto-conical configuration with a small diameter end and a large diameter end, and each small diameter end opening onto the first planar surface of the large plate and each large diameter end opening onto the second planar surface of the large plate;

operating the plasma cutter to cut the large plate into the one or more wear plates, each of the one or more wear plates including at least one of the holes or at least a part of one of the holes;

providing one or more fasteners, each fastener having a head of a frusto-conical shape capable of seating in respective holes in the one or more wear plates, the head being configured so that, when the head is seated in a hole, a lower end of the head is adjacent the small diameter end of the hole and an upper end of the head is adjacent the large diameter end of the hole and substantially flush with a surface of the one or more wear plates onto which the large diameter end of the hole opens;

placing the wear plate on the surface of the structure to be protected from abrasive wear;

inserting the one or more fasteners into respective holes in the one or more wear plates and corresponding registering holes formed in the structure to be protected; and utilizing the fastener to fasten the one or more wear plates to the structure.

5. The method according to claim 4, wherein the step of operating the plasma cutter to cut the holes comprises operating the plasma cutter to cut the holes in a direction from the first planar surface to the second planar surface.

6. The method according to claim 4, wherein the step of operating the plasma cutter to cut the large plate into one or more wear plates comprises operating the plasma cutter to cut the large plate in a plane inclined to normal of the large plate to create complimentary beveled edges on the one or more wear plates.

7. A wear plate system comprising:

one or more wear plates, each wear plate having a planar upper surface and a planar lower surface and being formed with frusto-conical through holes configured to receive respective fasteners, the upper and lower surfaces being parallel to each other over an entirety of the one or more wear plates, and the frusto-conical through holes having a large diameter end opening onto the upper surface and a small diameter end opening onto the lower surface; and one or more fasteners for each of the one or more wear plates, each fastener having a head of a frusto-conical shape configured to seat in one of the frusto-conical holes in the one or more wear plates such that, when the head is seated in one of the frusto-conical holes, a lower end of the head is adjacent the small diameter end of the hole and an opposite upper end of the head is adjacent the large diameter end of the hole and substantially flush with the upper surface of the respective wear plate.

8. The system according to claim 7, wherein each wear plate is cut from a larger plate using a plasma cutter.

9. The system according to claim 7, wherein each frusto-conical through hole is formed by cutting of the hole through the wear plate using a plasma cutter.

10. The system according to claim 7, wherein the head of each fastener has a hardness comparable to the hardness of its respective wear plate.

\* \* \* \* \*